US011706804B2

United States Patent
Damnjanovic et al.

(10) Patent No.: US 11,706,804 B2
(45) Date of Patent: Jul. 18, 2023

(54) TECHNOLOGY-SPECIFIC LISTEN BEFORE TALK PARAMETER ADJUSTMENTS FOR COMMON ENERGY DETECTION THRESHOLDS

(71) Applicant: QUALCOMM Incorporated, San Diego, CA (US)

(72) Inventors: Aleksandar Damnjanovic, Del Mar, CA (US); Maarten Menzo Wentink, Nijmegen (NL); Yisheng Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 17/325,738

(22) Filed: May 20, 2021

(65) Prior Publication Data
US 2021/0400726 A1    Dec. 23, 2021

Related U.S. Application Data

(60) Provisional application No. 63/042,311, filed on Jun. 22, 2020.

(51) Int. Cl.
*H04W 74/08* (2009.01)
*H04W 88/06* (2009.01)

(52) U.S. Cl.
CPC ....... *H04W 74/0816* (2013.01); *H04W 88/06* (2013.01)

(58) Field of Classification Search
CPC ......... H04W 74/0808; H04W 74/0816; H04W 74/008; H04W 52/34; H04W 52/967; H04W 36/16
(Continued)

(56) References Cited

U.S. PATENT DOCUMENTS 9,094,943 B2 * 7/2015 Klingenbrunn ....... H04W 36/16
9,408,162 B2 * 8/2016 Ho ...................... H04W 52/367
(Continued)

FOREIGN PATENT DOCUMENTS

CN         105246082 A  *  1/2016
WO    WO-2021262358 A1 * 12/2021  ........ H04W 74/0816

OTHER PUBLICATIONS

S. Thalanany, M. Irizarry and N. Saxena, "License-Assisted Access Considerations," in IEEE Communications Standards Magazine, vol. 1, No. 2, pp. 106-112, 2017, doi: 10.1109/MCOMSTD.2017.1500714. (Year: 2017).*

(Continued)

*Primary Examiner* — William D Cumming
(74) *Attorney, Agent, or Firm* — Norton Rose Fulbright US LLP

(57) ABSTRACT

Technology-specific listen before talk (LBT) parameter adjustments are disclosed for common energy detection (ED) thresholds. Some of the technologies sharing access to the same shared communication spectrum include additional access deferral procedures. Such technologies may be configured with additional compensating features to increase the likelihood of fairness in spectrum access across all technologies sharing a common ED threshold. Such additional compensating features may include a reduced contention window size relative to the technologies that do not include such additional access deferral procedures, increased maximum channel occupancy times (COTs) for longer transmissions, and the like. Each such additional compensating feature may be available under different circumstances, such as always available or available in response to the node activating one of the additional access deferral procedures. Additionally, such additional compensating features may, (Continued)

once initiated, be active and available for a predetermined period of time.

16 Claims, 8 Drawing Sheets

(58) Field of Classification Search
USPC .................................................. 370/336, 252
See application file for complete search history.

(56) References Cited

U.S. PATENT DOCUMENTS

| | | | | |
|---|---|---|---|---|
| 10,292,182 | B2* | 5/2019 | Yang | H04W 74/0808 |
| 2011/0158117 | A1* | 6/2011 | Ho | H04W 52/34 |
| | | | | 370/252 |
| 2012/0082046 | A1* | 4/2012 | Ho | H04W 52/34 |
| | | | | 370/252 |
| 2017/0238334 | A1* | 8/2017 | Yang | H04W 74/0808 |
| | | | | 370/336 |
| 2021/0400726 | A1* | 12/2021 | Damnjanovic | H04W 74/0816 |
| 2022/0038947 | A1* | 2/2022 | Zhang | H04W 74/008 |

OTHER PUBLICATIONS

M. Shafi, A. Hashimoto, M. Umehira, S. Ogose and T. Murase, "Wireless communications in the twenty-first century: a perspective," in Proceedings of the IEEE, vol. 85, No. 10, pp. 1622-1638, Oct. 1997, doi: 10.1109/5.640770. (Year: 1997).*

Falahati (Ericsson) S., et al., "Coexistence Mechanisms", IEEE 802.11-19/1088r1, IEEE Draft, 11-19-1088-01-COEX-COEXISTENCE-MECHANISMS, IEEE-SA Mentor, Piscataway, NJ, USA, vol. 802.11 COEX, No. 1, Jul. 16, 2019 (Jul. 16, 2019), pp. 1-11, Jul. 17, 2019, XP068153097, Retrieved from the Internet: URL: https://mentor.ieee.org/802.11/dcn/19/11-19-1088-01-coex-coexistence-mechanisms.pptx [retrieved on Jul. 16, 2019] p. 7-p. 8.

International Search Report and Written Opinion—PCT/US2021/033532—ISA/EPO—dated Sep. 21, 2021.

* cited by examiner

TECHNOLOGY-SPECIFIC LISTEN BEFORE TALK PARAMETER ADJUSTMENTS FOR COMMON ENERGY DETECTION THRESHOLDS

CROSS-REFERENCE TO RELATED APPLICATIONS

This application claims the benefit of U.S. Provisional Patent Application No. 63/042,311, entitled, "TECHNOLOGY-SPECIFIC LISTEN BEFORE TALK PARAMETER ADJUSTMENTS FOR COMMON ENERGY DETECTION THRESHOLDS," filed on Jun. 22, 2020, which is expressly incorporated by reference herein in its entirety.

BACKGROUND

Field

Aspects of the present disclosure relate generally to wireless communication systems, and more particularly, to technology-specific listen before talk (LBT) parameter adjustments for common energy detection (ED) thresholds.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, by a network node of a first radio access technology, to access a shared communication channel shared by a plurality of disparate radio access technologies, wherein the first radio access technology includes a common energy detection (ED) threshold for each of the plurality of disparate radio access technologies to access the shared communication channel and at least one other ED threshold different from the common ED threshold to enable an additional access deferral procedure for the shared communication channel, establishing, by the network node, access to the shared communication channel according to a compensating access feature available to the first radio access technology, and transmitting, by the network node, on the shared communication channel according to the compensating access feature.

In an additional aspect of the disclosure, an apparatus configured for wireless communication including means for determining, by a network node of a first radio access technology, to access a shared communication channel shared by a plurality of disparate radio access technologies, wherein the first radio access technology includes a common ED threshold for each of the plurality of disparate radio access technologies to access the shared communication channel and at least one other ED threshold different from the common ED threshold to enable an additional access deferral procedure for the shared communication channel, means for establishing, by the network node, access to the shared communication channel according to a compensating access feature available to the first radio access technology, and means for transmitting, by the network node, on the shared communication channel according to the compensating access feature.

In an additional aspect of the disclosure, a non-transitory computer-readable medium having program code recorded thereon. The program code further includes code to determine, by a network node of a first radio access technology, to access a shared communication channel shared by a plurality of disparate radio access technologies, wherein the first radio access technology includes a common ED threshold for each of the plurality of disparate radio access technologies to access the shared communication channel and at least one other ED threshold different from the common ED threshold to enable an additional access deferral procedure for the shared communication channel, code to establish, by the network node, access to the shared communication channel according to a compensating access feature available to the first radio access technology, and code to transmit, by the network node, on the shared communication channel according to the compensating access feature.

In an additional aspect of the disclosure, an apparatus configured for wireless communication is disclosed. The apparatus includes at least one processor, and a memory coupled to the processor. The processor is configured to determine, by a network node of a first radio access technology, to access a shared communication channel shared by a plurality of disparate radio access technologies, wherein the first radio access technology includes a common ED threshold for each of the plurality of disparate radio access technologies to access the shared communication channel and at least one other ED threshold different from the common ED threshold to enable an additional access deferral procedure for the shared communication channel, to establish, by the network node, access to the shared communication channel according to a compensating access feature available to the first radio access technology, and to transmit, by the network node, on the shared communication channel according to the compensating access feature.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
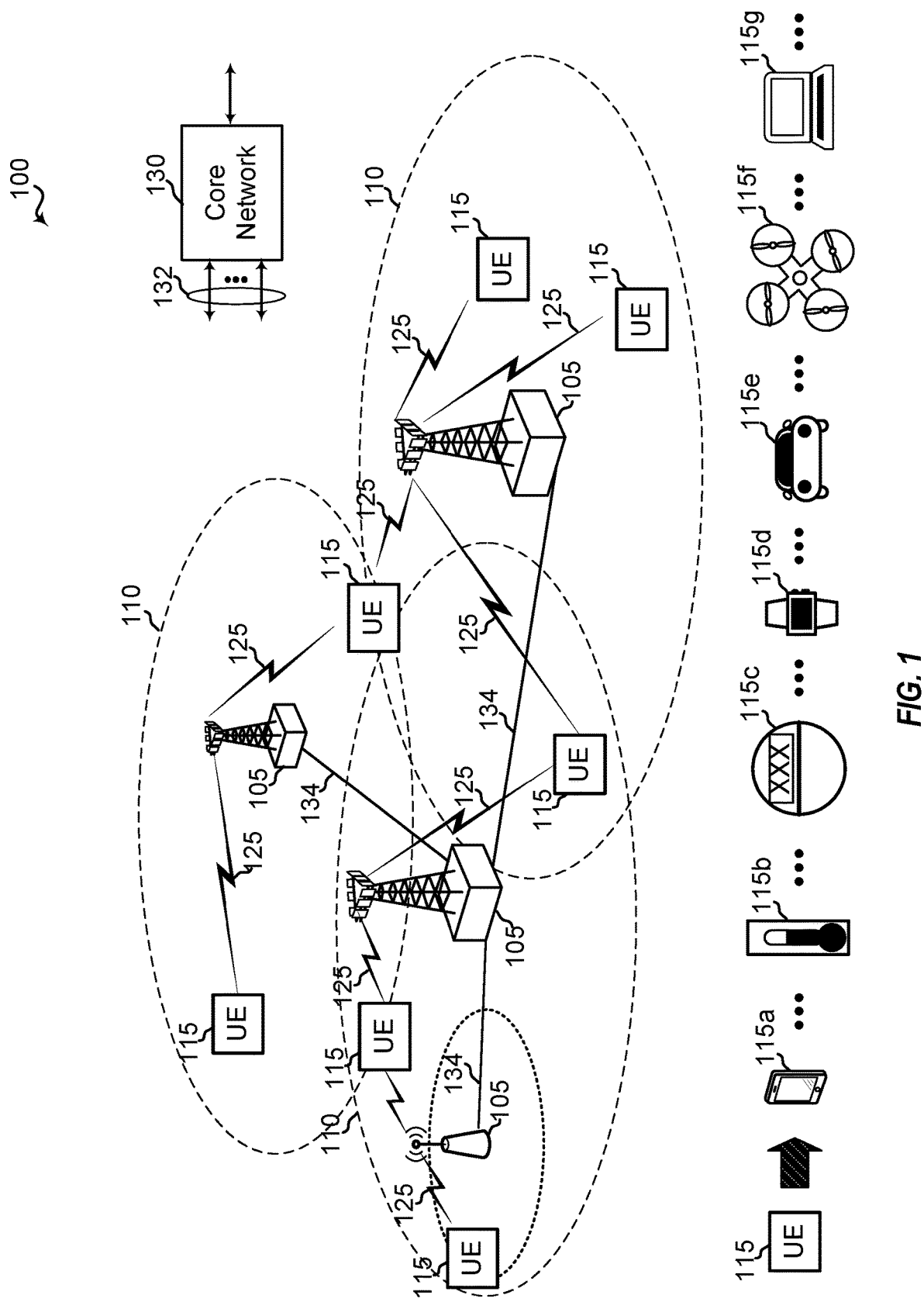
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports a common energy detection (ED) threshold for all technologies sharing access to the same shared communication spectrum, in which some such technologies that define additional access deferral procedures may be configured with additional compensating features, in accordance with the aspect of the present disclosure, to increase the likelihood of fairness in spectrum access across all technologies sharing the spectrum. Such additional compensating features may include a reduced contention window size relative to the technologies that do not include such additional access deferral procedures, increased maximum channel occupancy times (COTs) for longer transmissions, and the like. Each such additional compensating feature may be available under different circumstances, such as always available or available in response to the node activating one of the additional access deferral procedures. Additionally, such additional compensating features may, once initiated, be active and available for a predetermined period of time. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPIC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet (s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
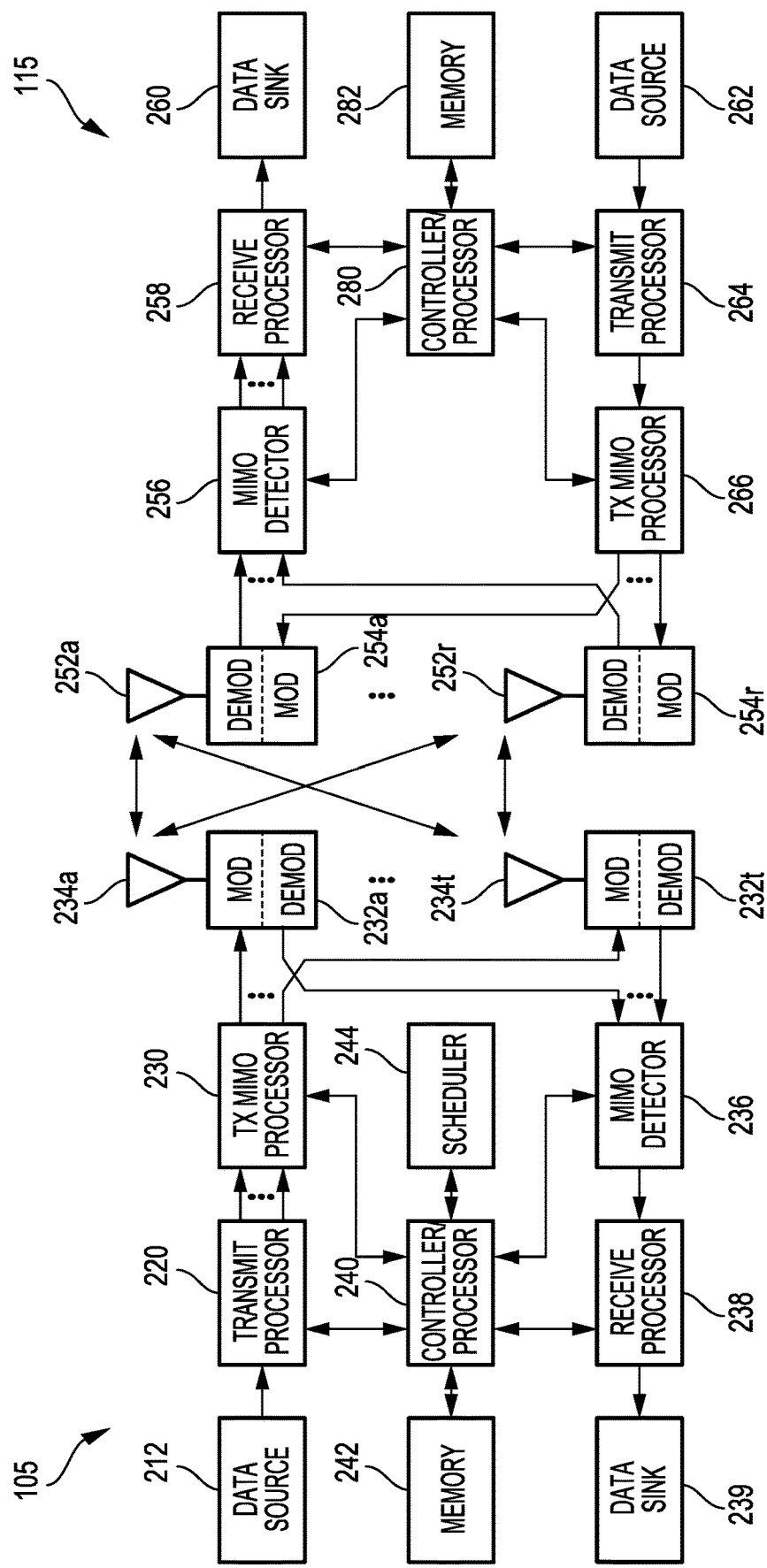
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

Figure 3:
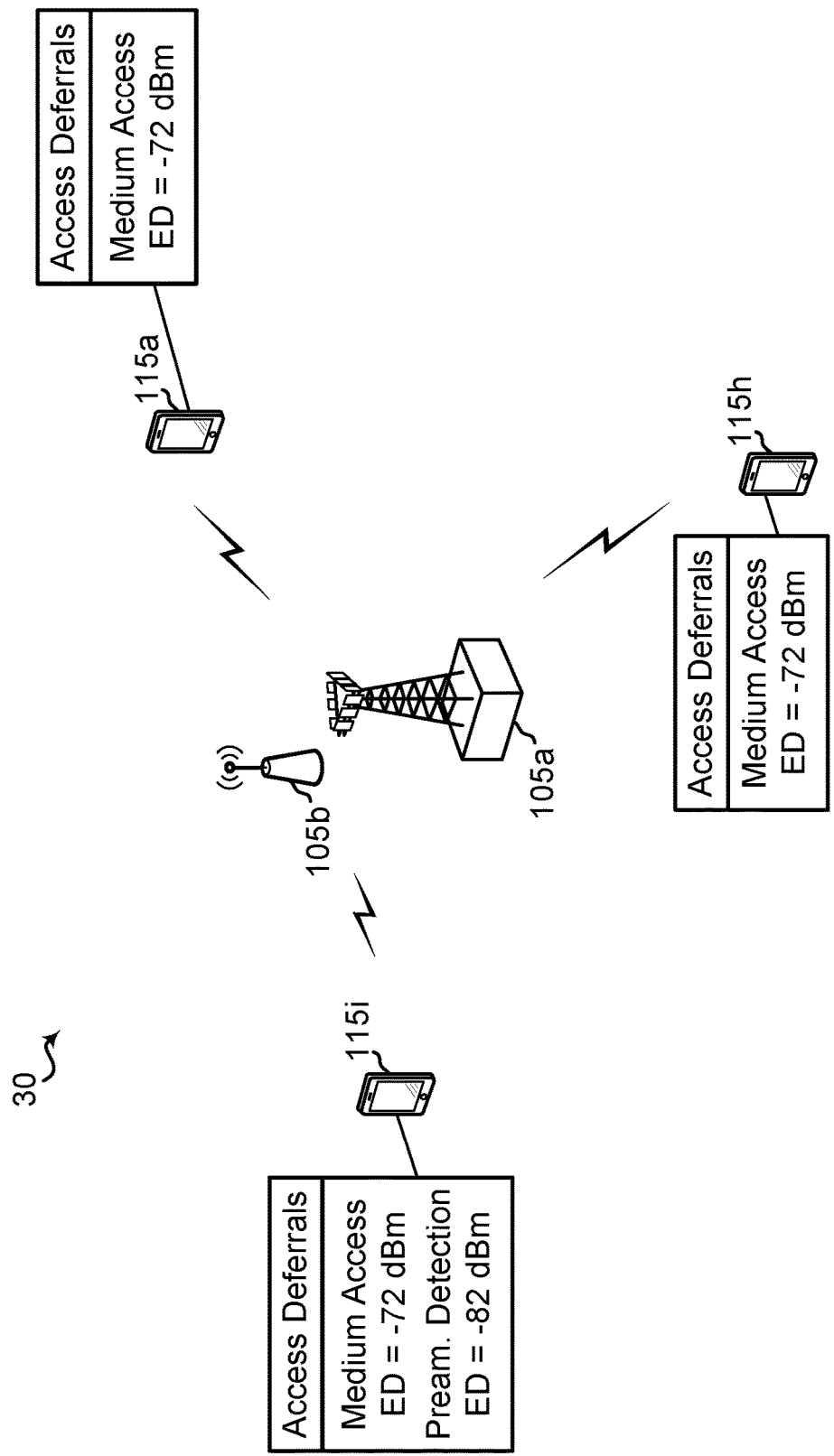
FIG. 3 is a block diagram illustrating a portion of a NR-U network that coexists with multiple RATs using a shared communication spectrum.

FIG. 3 is a block diagram illustrating a portion of NR-U network 30 that coexists with multiple RATs using a shared communication spectrum. The illustrated portion of NR-U network 30 includes NR-U nodes, UE 115a and 115h and base station 105a, which coexists with a WiFi network via WiFi nodes, UE 115*i* and base station 105*b*. Each of UEs 115*a*, 115*h*, and 115*i* also include technology-specific access deferrals. NR-U operations define media access through transmitter sensing. For example, energy detection (ED) has been suggested for the transmitter sensing at a threshold level suitable for unlicensed spectrum. In some proposed implementations, an ED threshold of −72 dBm has been indicated to be suitable for accessing such unlicensed spectrum by NR-U nodes, such as UEs 115*a* and 115*h* and base station 105*a*. However, NR-U networks, such as NR-U network 30, may coexist on the same shared communication spectrum with multiple different radio access technologies (RATs), which may have various different access procedures and deferrals, including different ED thresholds or additional ED thresholds for additional access procedures or deferrals. For example, in addition to a medium access ED threshold, WiFi medium access procedures also may rely on a receiver protection procedure through preamble detection and request-to-send (RTS)/clear-to-send (CTS) signaling. Because WiFi nodes, such as UE 115*i* and base station 105*b*, additionally defer medium access based on a preamble detection ED threshold at −82 dBm, suggestions have been put forth to increase the access ED threshold for WiFi nodes to −62 dBm.

Different ED thresholds among different technologies can potentially lead to fairness issues in the case of NR-U and WiFi coexistence, which may favor WiFi access over NR-U access. It has been suggested that all RATs accessing a shared communication spectrum should use the same access ED threshold. However, using the same access ED threshold among different technologies can itself lead to fairness issues in the case of NR-U and WiFi coexistence, which may favor NR-U access over WiFi access. Accordingly, the various aspects of the present disclosure are directed to compensating RATs that have additional access deferral procedures that may lead to unfair access to a shared communication spectrum where all accessing RATs use a common access ED threshold.

Figure 4:
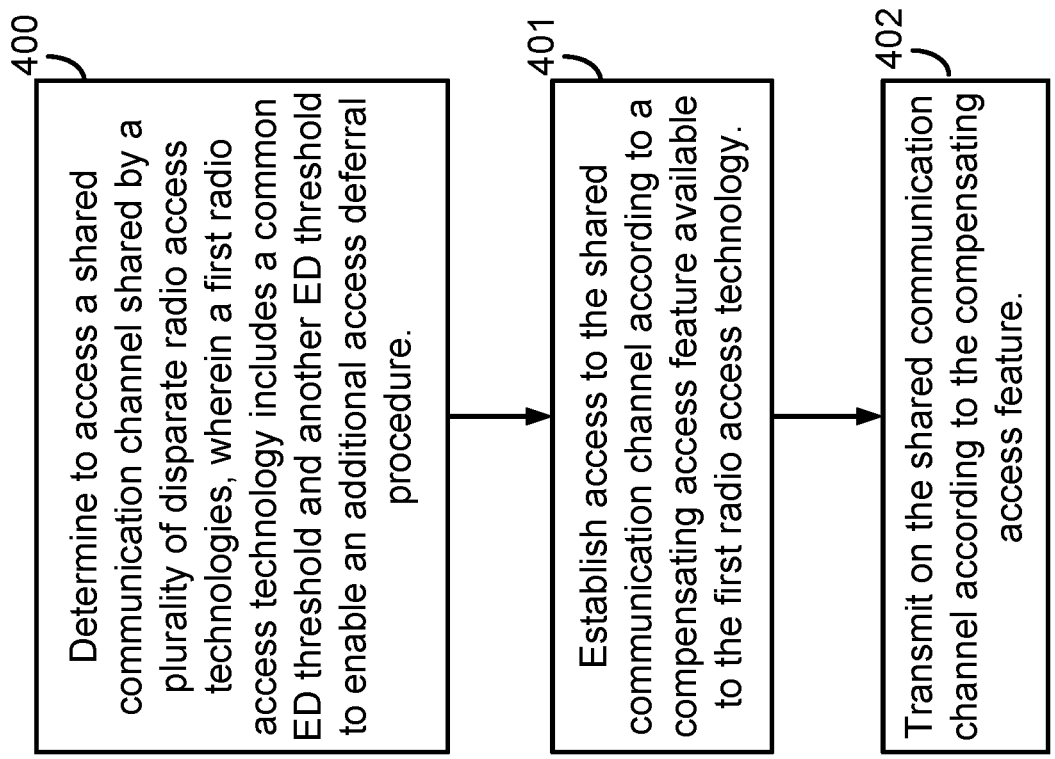
FIG. 4 is a block diagram illustrating example blocks executed to implement one aspect of the present disclosure.
Figure 7:
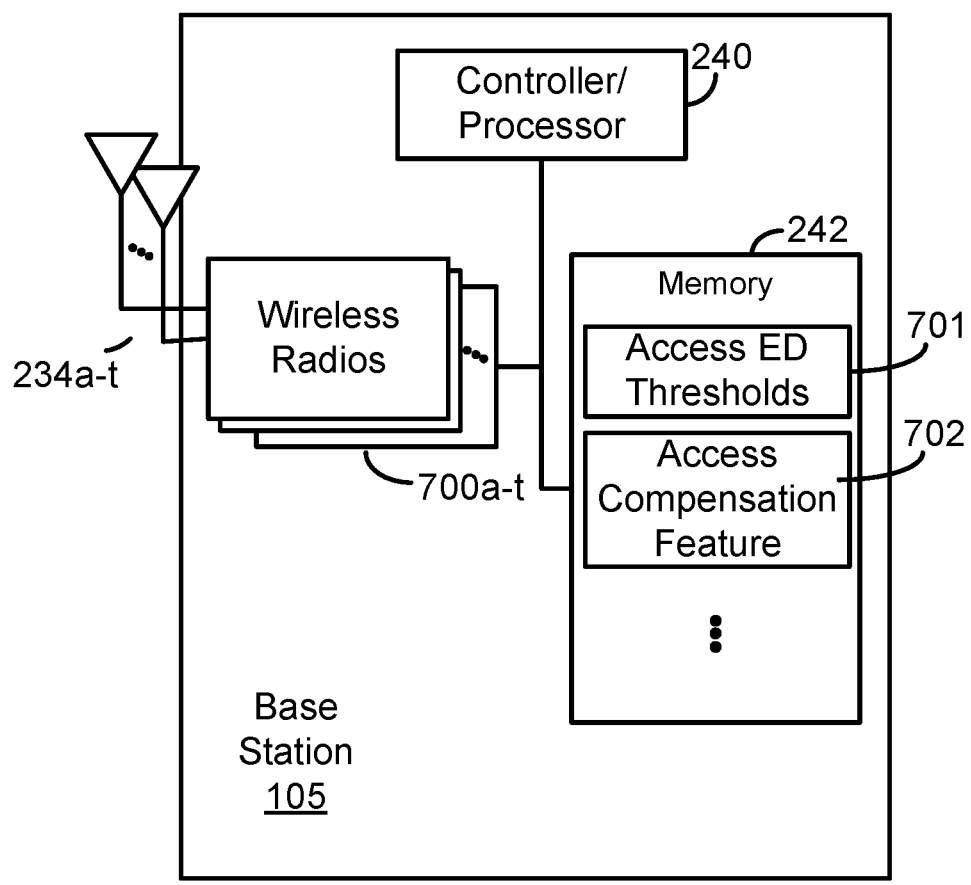
FIG. 7 is a block diagram illustrating an example implementation of a base station configured according to one aspect of the present disclosure.

FIG. 4 is a block diagram illustrating example blocks executed to implement one aspect of the present disclosure. The example blocks will also be described with respect to base station 105 as illustrated in FIGS. 2 and 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 700*a-t* and antennas 234*a-t*. Wireless radios 700*a-t* includes various components and hardware, as illustrated in FIG. 2 for base station 105, including modulator/demodulators 232*a-t*, MIMO detector 236, receive processor 238, transmit processor 220, and TX MIMO processor 230.

Figure 8:
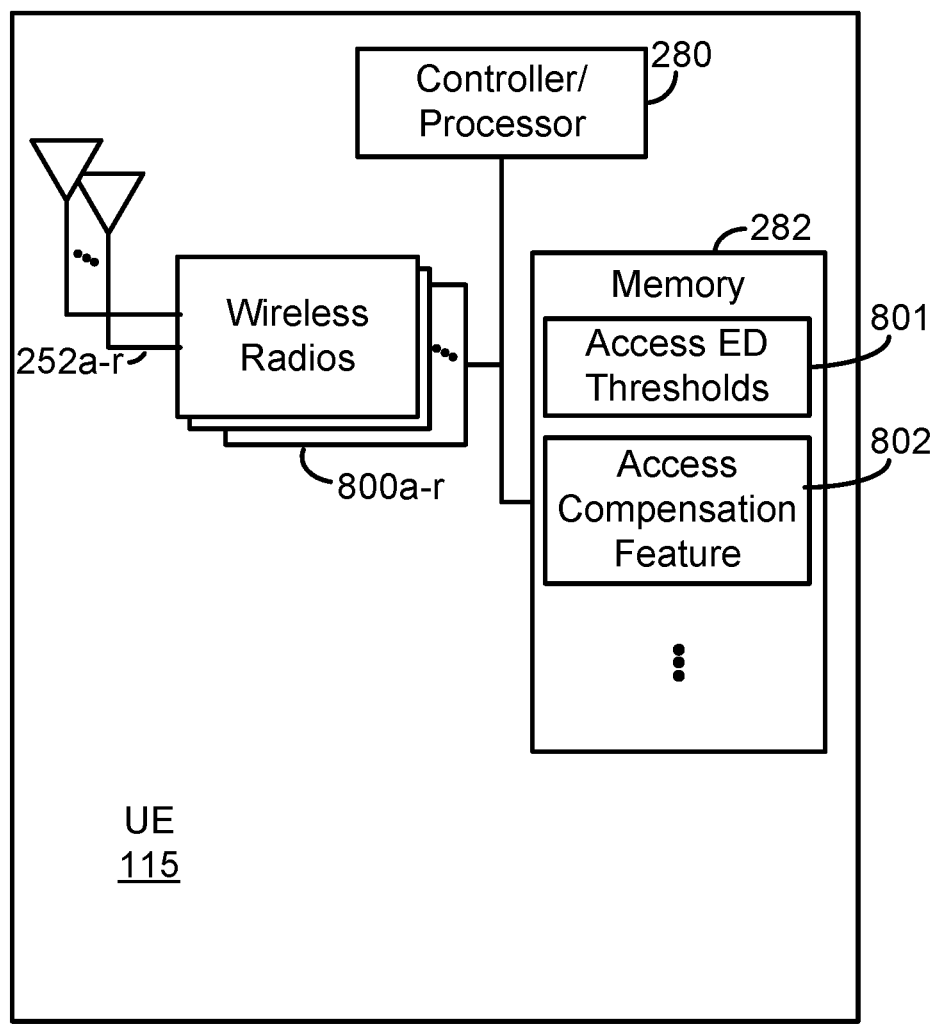
FIG. 8 is a block diagram illustrating an example implementation of an UE configured according to one aspect of the present disclosure.

The example blocks will also be described with respect to UE 115 as illustrated in FIGS. 2 and 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800*a-r* and antennas 252*a-r*. Wireless radios 800*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 400, a network node of a first radio access technology determines to access a shared communication channel shared by a plurality of disparate radio access technologies, wherein the first radio access technology includes a common ED threshold for each of the plurality of disparate radio access technologies to access the shared communication channel and at least one other ED threshold different from the common ED threshold to enable an additional access deferral procedure for the shared communication channel. According to the illustrated aspect, all technologies sharing the shared communication spectrum may attempt access using a common access ED threshold, for example ED=−72 dBm. In order to compensate for the possible fairness issue when technology like WiFi includes an additional access deferral that backs off for preamble detection at a different ED threshold, for example ED=−82 dBm, in addition to the common access ED threshold at −72 dBm, other access parameters may be relaxed.

When the network node is implemented as a base station, such as base station 105, the ED thresholds for any access procedures of the RAT or RATs operating at base station 105 may be stored in memory 242 at access ED thresholds 701. Thus, when attempting access to the shared communication channel, base station 105 may select the appropriate ED threshold for performing ED on the shared channel. For example, for regular access, base station 105 may, under control of controller/processor 240, use the common ED threshold for the standard access ED procedure. Similarly, when operating in a WiFi capacity, base station 105 may use an additional access restriction for preamble detection. Base station 105, under control of controller/processor 240, would then use the ED threshold in access ED thresholds 701 for preamble detection.

When the network node is implemented as a UE, such as UE 115, the ED thresholds for any access procedures of the RAT or RATs operating at UE 115 may be stored in memory 282 at access ED thresholds 801. Similarly to implementation as base station 105, when attempting access to the shared communication channel, UE 115 may select the appropriate ED threshold from access ED thresholds 801 for performing ED on the shared channel. For example, for regular access, UE 115 may, under control of controller/processor 280, use the common ED threshold in access ED thresholds 801 for the standard access ED procedure. Similarly, when operating in a WiFi capacity, UE 115 may use an additional access restriction for preamble detection. UE 115, under control of controller/processor 280, would then use the ED threshold in access ED thresholds 801 for preamble detection.

At block 401, the network node establishes access to the shared communication channel according to a compensating access feature available to the first radio access technology. Network nodes from other technologies that include additional deferral procedures in addition to access ED can be allowed to have a compensating access procedure. Such a compensating access procedure may include a reduced contention window size compared to the technology that only relies on energy. Additional or alternatively, the compensating access procedure may allow the effected network node to transmit at larger maximum channel occupancy time (COT) compared to other technologies sharing the communication spectrum. The availability of the compensating access procedure to the effected node may either be short term or for a predetermined period of time. Additionally, the procedure may be activated as a function of the additional deferral process being executed. For example, the compensating access procedure may be triggered for availability to a WiFi node in response to the WiFi node triggering a preamble detection. Still further, the compensating access procedures may always be available to such nodes regardless of whether the additional deferral process has been executed. Also, combinations of these configurations may be implemented. For example, with the WiFi node, upon triggering a preamble detection procedure, the compensating access feature may be available for a predetermined period of time.

When the network node is implemented as base station 105, base station 105, under control of controller/processor 240, will execute access compensation feature 702, stored in memory 242, when base station 105 is subject to additional access deferral procedures. The additional functionality enabled by execution of the instructions and code of access compensation feature 702 by controller/processor 240 (referred to herein as the "execution environment" of access compensation feature 702), provide for base station 105 to implement compensating features for access to the shared communication channel. In one example aspect, the compensating feature or features provided within the execution environment of access compensation feature 702 allow for base station 105 to use a reduced contention window size during channel access procedures. In addition or alternatively to such reduced contention window size, the execution environment of access compensation feature 702 may provide an increased MCOT size for transmissions when access to the shared channel is obtained.

When the network node is implemented as UE 115, UE 115, under control of controller/processor 280, will also execute access compensation feature 802, stored in memory 282, when UE 115 is subject to additional access deferral procedures. As with base station 105, the execution environment of access compensation feature 802 provides for UE 115 to implement compensating features for access to the shared communication channel. In an example aspect, the compensating feature provided within the execution environment of access compensation feature 802 allow for UE 115 to use a reduced contention window size during channel access procedures. In addition or alternatively to such reduced contention window size, the execution environment of access compensation feature 802 may provide an increased MCOT size for transmissions when access to the shared channel is obtained.

At block 402, the network node transmits on the shared communication channel according to the compensating access feature. Once the network node has established access to the shared communication spectrum according to the compensating access procedure, the network node may transmit within the established COT.

When the network node is implemented as base station 105, after successfully obtaining access to the shared communication channel using the compensating figure within the execution environment of access compensation feature 702, base station 105 would transmit any data or control signals via wireless radios 700a-t and 234a-t.

When the network node is implemented as UE 115, after successfully obtaining access to the shared communication channel using the compensating figure within the execution environment of access compensation feature 802, UE 115 would similarly transmit any data or reference signals via wireless radios 800a-r and 252a-r.

Figure 5:
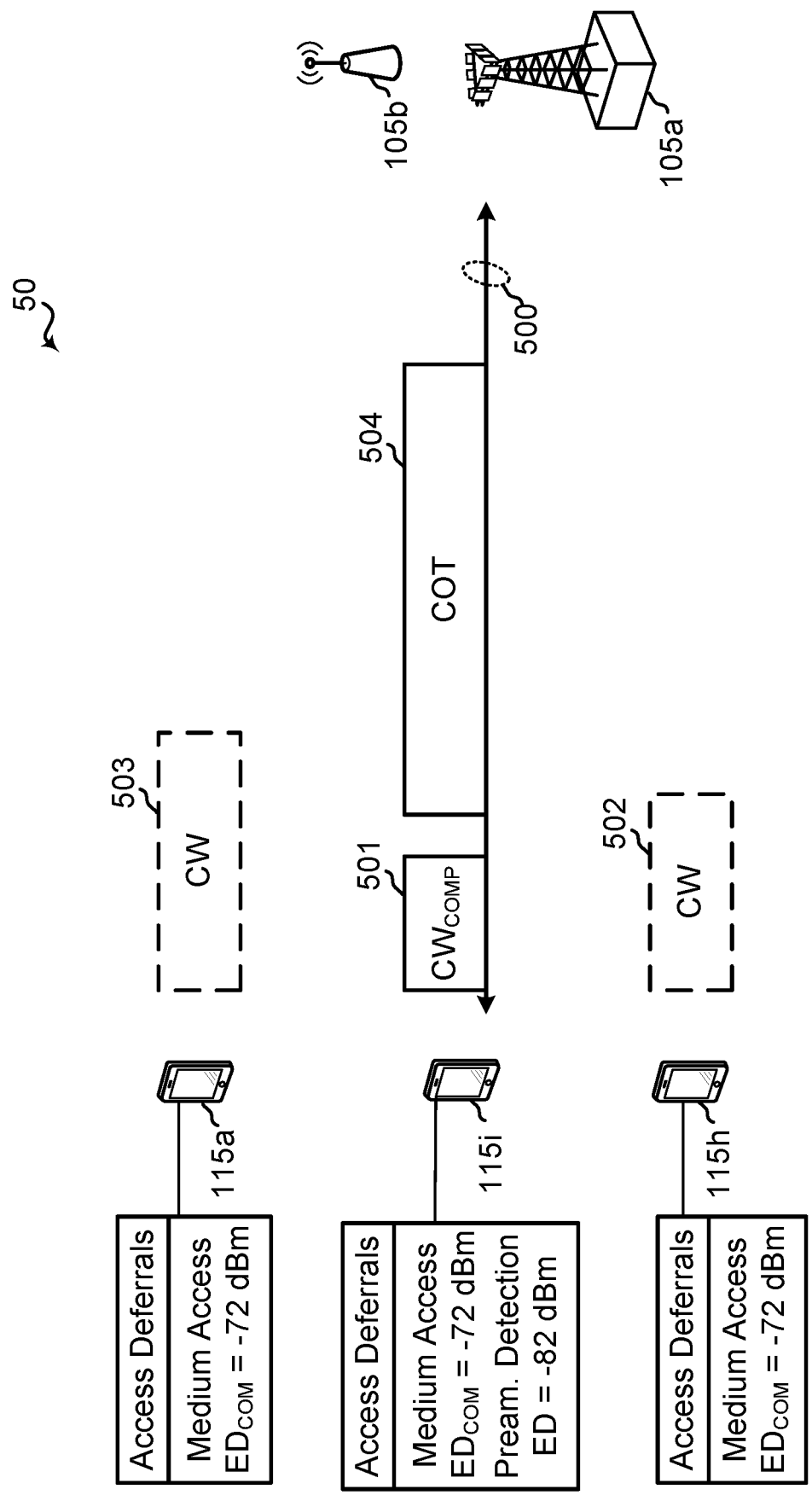
FIG. 5 is a block diagram illustrating a portion of a NR-U network configured for coexistence with multiple RATs according to one aspect of the present disclosure.

FIG. 5 is a block diagram illustrating a portion of NR-U network 50 configured for coexistence with multiple RATs according to one aspect of the present disclosure. NR-U nodes UEs 115a and 115h each includes access deferrals including ED access using a common threshold (e.g., ED threshold=−72 dBm). UEs 115a and 115h engage in communications with the NR-U base station, base station 105a, using shared communication channel 500. A WiFi network shares shared communication channel 500 between WiFi UE 115i and WiFi access point, base station 105b. The WiFi UE, UE 115i includes multiple access deferrals, including ED access using the common threshold (e.g., ED threshold=−72 dBm), and preamble detection, which uses a different ED threshold (e.g., preamble detection ED threshold=−82 dBm). According to the illustrated aspect, a compensating access procedure may be available to all RATs with additional access deferrals, including UE 115i at any time.

Each of UEs 115a, 115h, and 115i attempt to access shared communication channel 500 for uplink transmissions. Each of the NR-U nodes, UEs 115a and 115h, use a standard contention window (CW) size and perform ED during CW 503 and CW 502, respectively, on shared communication channel 500 using the common ED threshold. As a WiFi node, UE 115i is able to use a special compensating CW size ($CW_{COMP}$), which is shorter than the standard CW size. Thus, UE 115i performs ED at the common ED threshold during $CW_{COMP}$ 501. With the shorter CW size, UE 115i obtains access to shared communication channel 500 and establishes COT 504 for transmissions. In one example aspect, COT 504 may be limited by a standard maximum COT size, shared by all technologies accessing shared communication channel 500. In another example aspect, COT 504 may be part of the compensating access feature available to UE 115i. In such an aspect, COT 504 is limited to a special maximum COT size that is larger than the standard maximum COT size. Thus, in such example, the compensating access feature includes both the decreased CW size and the increased maximum COT size. Upon achieving access to shared communication channel 500, UE 115i may transmit within COT 504 to base station 105b.

In one example implementation, the contention window size adjustment may provide for NR-U nodes, with no additional deferrals, with a max contention window size, CWmax={K*N, 2K*N, . . . (2^L)*K*N}; and for WiFi nodes, with an additional preamble detection deferral, the maximum contention window size, Cwmax={N, 2*N, . . . (2^L)*N}; where K>1. In an example of the maximum COT size adjustment, NR-U nodes with no additional deferrals include a maximum COT=M; while WiFi nodes with an additional preamble detection deferral includes a maximum COT=K*M; where K>1. Other example relationships or equations may define he shorter CW size comparable to the common CW size, as well as defining a longer maximum COT size comparable to the standard maximum COT.

Figure 6:
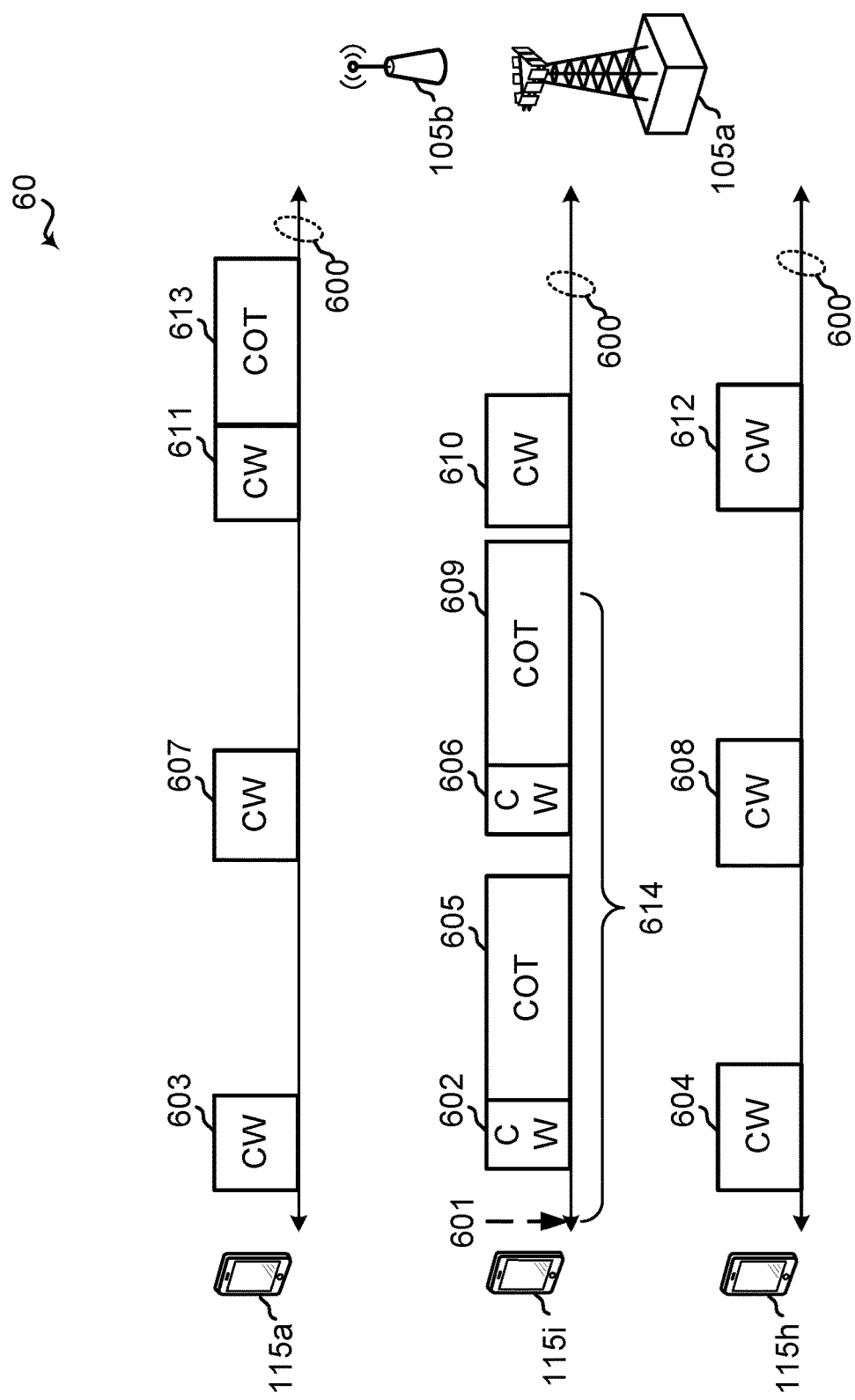
FIG. 6 is a block diagram illustrating a portion of a NR-U network configured for coexistence with multiple RATs according to one aspect of the present disclosure.

FIG. 6 is a block diagram illustrating a portion of NR-U network 60 configured for coexistence with multiple RATs according to one aspect of the present disclosure. As indicated with respect to FIG. 5, NR-U nodes UEs 115a and 115h each includes access deferrals including ED access using a common threshold (e.g., ED threshold=−72 dBm). UEs 115a and 115h engage in communications with the NR-U base station, base station 105a, using shared communication channel 600. A WiFi network shares shared communication channel 600 between WiFi UE 115i and WiFi access point, base station 105b. The WiFi UE, UE 115i includes multiple access deferrals, including ED access using the common threshold (e.g., ED threshold=−72 dBm), and preamble detection, which uses a different ED threshold (e.g., preamble detection ED threshold=−82 dBm). According to the illustrated aspect, the compensating access procedure may be available to all RATs with additional access deferrals, including UE 115*i*, in response to the node initiating the additional access deferral for a predefined period of time 614.

Each of UEs 115*a*, 115*h*, and 115*i* each determine to access shared communication spectrum 600 for uplink transmissions. At 601, UE 115*i* initiates a preamble detection procedure and defers access to shared communication spectrum 600. The initiation of the preamble detection procedure at 601 triggers the availability to UE 115*i* of the compensating access procedures. UE 115*i* is able to use a shortened CW size, CW 602 and 606 to attempt access to share communication spectrum 600, while UEs 115*a* and 115*h* use standard CW size, CWs 603 and 604. With the shortened CW, CW 602 and 606, UE 115*i* obtains access to shared communication spectrum 600 and establishes COT 605, which is limited by a larger, compensating maximum COT size. These compensating access features are available to UE 115*i* over predefined period of time 614. Thus, after ending transmissions in COT 605, each of UEs 115*a*, 115*h*, and 115*i* attempt to access shared communication spectrum 600. With the remaining availability of the compensating access features, UE 115*i* again obtains access to shared communication spectrum 600 over UE 115*a* and 115*h*, which use the standard CW size for CWs 603 and 604. UE 115*i* again establishes a lengthened COT size in COT 609 to perform uplink transmissions to base station 105*b*.

After expiration of predefined period of time 614, the compensating access features will no longer be available to UE 115*i* until it initiates its additional access deferral again. Accordingly, as UE 115*a*, 115*h*, and 115*i* each attempt to access shared communication spectrum 600, each uses the standard CW size in CWs 610-612. With the standard size CW, UE 115*a* obtains access to shared communication spectrum 600 and establishes a standard size COT, COT 613, for uplink transmissions to base station 105*a*.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first example aspect of wireless communication includes determining, by a network node of a first radio access technology, to access a shared communication channel shared by a plurality of disparate radio access technologies, wherein the first radio access technology includes a common ED threshold for each of the plurality of disparate radio access technologies to access the shared communication channel and at least one other ED threshold different from the common ED threshold to enable an additional access deferral procedure for the shared communication channel; establishing, by the network node, access to the shared communication channel according to a compensating access feature available to the first radio access technology; and transmitting, by the network node, on the shared communication channel according to the compensating access feature.

A second aspect, alone or in combination with the first aspect, wherein the compensating access feature includes one or more of a reduced contention window size reduced in relation to a common contention window size available to other radio access technologies of the plurality of disparate radio access technologies; and an increased MCOT increased in relation to a common MCOT available to the other radio access technologies.

A third aspect, alone or in combination with the second aspect, wherein the compensating access feature is available to the network node of the first radio access technology one of whenever the network node determines to access the shared communication channel; or in response to the network node activating the additional access deferral procedure.

A fourth aspect, alone or in combination with the third aspect, wherein the compensating access feature remains active for a predetermined period of time one of when activated by the network node; or beginning on access to the shared communication channel.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a network node of a first radio access technology, the method comprising:
   determining to access a shared communication channel shared by a plurality of disparate radio access technologies, wherein the first radio access technology includes a common energy detection (ED) threshold for each of the plurality of disparate radio access technologies to access the shared communication channel and at least one other ED threshold different from the common ED threshold to enable an additional access deferral procedure for the shared communication channel, the additional access deferral procedure using the at least one other ED threshold and being in addition to ED access using the common ED threshold;
   establishing access to the shared communication channel according to a compensating access feature available to the first radio access technology; and
   transmitting on the shared communication channel according to the compensating access feature.

2. The method of claim 1, wherein the compensating access feature includes one or more of:
   a reduced contention window size reduced in relation to a common contention window size available to other radio access technologies of the plurality of disparate radio access technologies; and
   an increased maximum channel occupancy time (MCOT) increased in relation to a common MCOT available to the other radio access technologies.

3. The method of claim 2, wherein the compensating access feature is available to the network node of the first radio access technology one of:
   whenever the network node determines to access the shared communication channel; or
   in response to the network node activating the additional access deferral procedure.

4. The method of claim 3, wherein the compensating access feature remains active for a predetermined period of time one of:
   when activated by the network node; or
   beginning on access to the shared communication channel.

5. An apparatus configured for wireless communication, comprising:
   means for determining, by a network node of a first radio access technology, to access a shared communication channel shared by a plurality of disparate radio access technologies, wherein the first radio access technology includes a common energy detection (ED) threshold for each of the plurality of disparate radio access technologies to access the shared communication channel and at least one other ED threshold different from the common ED threshold to enable an additional access deferral procedure for the shared communication channel, the additional access deferral procedure using the at least one other ED threshold and being in addition to ED access using the common ED threshold;
   means for establishing, by the network node, access to the shared communication channel according to a compensating access feature available to the first radio access technology; and means for transmitting, by the network node, on the shared communication channel according to the compensating access feature.

6. The apparatus of claim 5, wherein the compensating access feature includes one or more of:
a reduced contention window size reduced in relation to a common contention window size available to other radio access technologies of the plurality of disparate radio access technologies; and
an increased maximum channel occupancy time (MCOT) increased in relation to a common MCOT available to the other radio access technologies.

7. The apparatus of claim 6, wherein the compensating access feature is available to the network node of the first radio access technology one of:
whenever the network node determines to access the shared communication channel; or
in response to the network node activating the additional access deferral procedure.

8. The apparatus of claim 7, wherein the compensating access feature remains active for a predetermined period of time one of:
when activated by the network node; or
beginning on access to the shared communication channel.

9. A non-transitory computer-readable medium having program code recorded thereon, the program code comprising:
program code executable by a computer operable to cause the computer to determine, by a network node of a first radio access technology, to access a shared communication channel shared by a plurality of disparate radio access technologies, wherein the first radio access technology includes a common energy detection (ED) threshold for each of the plurality of disparate radio access technologies to access the shared communication channel and at least one other ED threshold different from the common ED threshold to enable an additional access deferral procedure for the shared communication channel, the additional access deferral procedure using the at least one other ED threshold and being in addition to ED access using the common ED threshold;
program code executable by the computer operable to cause the computer to establish, by the network node, access to the shared communication channel according to a compensating access feature available to the first radio access technology; and
program code executable by the computer operable to cause the computer to transmit, by the network node, on the shared communication channel according to the compensating access feature.

10. The non-transitory computer-readable medium of claim 9, wherein the compensating access feature includes one or more of:
a reduced contention window size reduced in relation to a common contention window size available to other radio access technologies of the plurality of disparate radio access technologies; and
an increased maximum channel occupancy time (MCOT) increased in relation to a common MCOT available to the other radio access technologies.

11. The non-transitory computer-readable medium of claim 10, wherein the compensating access feature is executable by the network node of the first radio access technology one of:
whenever the network node determines to access the shared communication channel; or
in response to the network node activating the additional access deferral procedure.

12. The non-transitory computer-readable medium of claim 11, wherein the compensating access feature remains in execution for a predetermined period of time one of:
when activated by the network node; or
beginning on access to the shared communication channel.

13. An apparatus configured for wireless communication, the apparatus comprising:
at least one processor; and
a memory coupled to the at least one processor,
wherein the at least one processor is configured:
to determine, by a network node of a first radio access technology, to access a shared communication channel shared by a plurality of disparate radio access technologies, wherein the first radio access technology includes a common energy detection (ED) threshold for each of the plurality of disparate radio access technologies to access the shared communication channel and at least one other ED threshold different from the common ED threshold to enable an additional access deferral procedure for the shared communication channel, the additional access deferral procedure using the at least one other ED threshold and being in addition to ED access using the common ED threshold;
to establish, by the network node, access to the shared communication channel according to a compensating access feature available to the first radio access technology; and
to transmit, by the network node, on the shared communication channel according to the compensating access feature.

14. The apparatus of claim 13, wherein the compensating access feature includes one or more of:
a reduced contention window size reduced in relation to a common contention window size available to other radio access technologies of the plurality of disparate radio access technologies; and
an increased maximum channel occupancy time (MCOT) increased in relation to a common MCOT available to the other radio access technologies.

15. The apparatus of claim 14, wherein the compensating access feature is executable by the network node of the first radio access technology one of:
whenever the network node determines to access the shared communication channel; or
in response to the network node activating the additional access deferral procedure.

16. The apparatus of claim 15, wherein the compensating access feature remains active for a predetermined period of time one of:
when activated by the network node; or
beginning on access to the shared communication channel.

* * * * *